United States Patent
Okamura

(10) Patent No.: US 8,891,833 B2
(45) Date of Patent: Nov. 18, 2014

(54) IMAGE PROCESSING APPARATUS AND IMAGE PROCESSING METHOD

(75) Inventor: Satoshi Okamura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 230 days.

(21) Appl. No.: 13/416,946

(22) Filed: Mar. 9, 2012

(65) Prior Publication Data
US 2012/0237089 A1 Sep. 20, 2012

(30) Foreign Application Priority Data

Mar. 18, 2011 (JP) ................................ 2011-060547
Feb. 21, 2012 (JP) ................................ 2012-035594

(51) Int. Cl.
*G06K 9/00* (2006.01)

(52) U.S. Cl.
CPC ...................................... *G06K 9/00* (2013.01)
USPC ....................................................... 382/118

(58) Field of Classification Search
None
See application file for complete search history.

(56) References Cited

U.S. PATENT DOCUMENTS

| | | | | |
|---|---|---|---|---|
| 5,774,591 | A * | 6/1998 | Black et al. | 382/236 |
| 7,218,759 | B1 * | 5/2007 | Ho et al. | 382/118 |
| 7,613,332 | B2 * | 11/2009 | Enomoto et al. | 382/115 |
| 7,860,280 | B2 * | 12/2010 | Danowitz | 382/118 |
| 8,031,914 | B2 * | 10/2011 | Zhang | 382/118 |
| 8,149,280 | B2 * | 4/2012 | Yoda | 348/207.1 |
| 8,396,262 | B2 * | 3/2013 | Aisaka et al. | 382/118 |
| 2005/0024516 | A1 * | 2/2005 | Fish et al. | 348/333.03 |

FOREIGN PATENT DOCUMENTS

| | | |
|---|---|---|
| JP | 2000-253397 A | 9/2000 |
| JP | 2008-271310 A | 11/2008 |

* cited by examiner

*Primary Examiner* — Daniel Mariam
(74) *Attorney, Agent, or Firm* — Canon USA, Inc., IP Division

(57) ABSTRACT

Provided is an image processing apparatus including a segmentation unit configured to segment image data into a plurality of segments to create a plurality of segmented image data, a detection unit configured to execute face detection processing for detecting a face area from image data before being segmented and each of the plurality of segmented image data, a recognition unit configured to execute recognition processing for determining whether the face detected by the detection unit is a face of a registered person, in each of the plurality of segmented image data, and a control unit configured to control whether to cause the recognition unit to execute the recognition processing as to each of the plurality of segmented image data depending on a result of the face detection in the image data before being segmented.

6 Claims, 13 Drawing Sheets

FIG. 3B
SEGMENTED IMAGE DATA A TO D
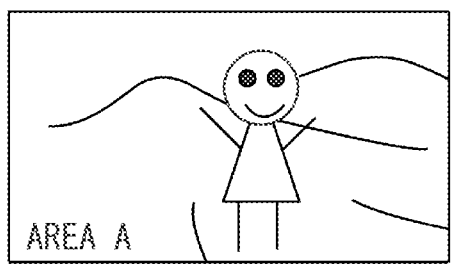
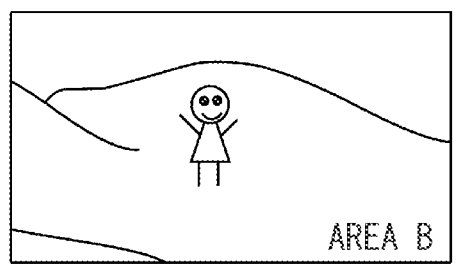
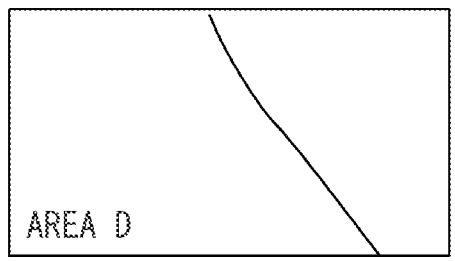
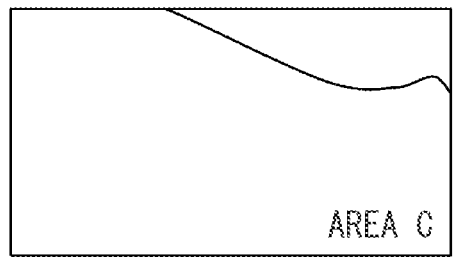

REDUCED IMAGE DATA E

FIG. 7A

LIST OF FACE DETECTION PROCESSING AND RECOGNITION PROCESSING IN CONVENTIONAL ART

| TYPE OF CAMERA SIGNAL PROCESSING | LIST OF FACE DETECTION PROCESSING AND RECOGNITION PROCESSING | | | | | | |
|---|---|---|---|---|---|---|---|
| A | DETECTION(1) | RECOGNITION(1) | DETECTION(2) | RECOGNITION(2) | DETECTION(3) | RECOGNITION(3) | |
| B | DETECTION(1) | RECOGNITION(1) | DETECTION(2) | RECOGNITION(2) | DETECTION(3) | RECOGNITION(3) | |
| C | DETECTION(1) | STANDBY(1) | DETECTION(2) | STANDBY(2) | DETECTION(3) | STANDBY(3) | |
| D | DETECTION(1) | STANDBY(1) | DETECTION(2) | STANDBY(2) | DETECTION(3) | STANDBY(3) | |
| FIRST DETECTION AND RECOGNITION PERIOD | ←—— 2T ——→ | | | | | | ↕ T |
| SECOND DETECTION AND RECOGNITION PERIOD | | | ←—— 2T ——→ | | | | |
| THIRD DETECTION AND RECOGNITION PERIOD | | | | | ←—— 2T ——→ | | |

FIG. 7B

LIST OF FACE DETECTION PROCESSING AND RECOGNITION PROCESSING IN FIRST EMBODIMENT

LIST OF FACE DETECTION PROCESSING AND RECOGNITION PROCESSING

| TYPE OF CAMERA SIGNAL PROCESSING | | | | | | | |
|---|---|---|---|---|---|---|---|
| A | | RECOGNITION (1) | RECOGNITION (2) | RECOGNITION (3) | RECOGNITION (4) | RECOGNITION (5) | |
| B | DETECTION (1) | DETECTION (1) | RECOGNITION (1) | DETECTION (3) | RECOGNITION (3) | DETECTION (5) | |
| C | DETECTION (1) | DETECTION (1) | DETECTION (2) | DETECTION (3) | DETECTION (4) | DETECTION (5) | |
| D | DETECTION (1) | DETECTION (1) | DETECTION (2) | DETECTION (3) | DETECTION (4) | DETECTION (5) | |
| E | DETECTION (1) | DETECTION (2) | DETECTION (3) | DETECTION (4) | DETECTION (5) | DETECTION (6) | T |
| FIRST DETECTION AND RECOGNITION PERIOD | | 2T / 3T | | | | | |
| SECOND DETECTION AND RECOGNITION PERIOD | | | 2T | | | | |
| THIRD DETECTION AND RECOGNITION PERIOD | | | | 2T / 3T | | | |

FIG. 7C

LIST OF FACE DETECTION PROCESSING AND RECOGNITION PROCESSING IN SECOND EMBODIMENT

| TYPE OF CAMERA SIGNAL PROCESSING | LIST OF FACE DETECTION PROCESSING AND RECOGNITION PROCESSING | | | | | | |
|---|---|---|---|---|---|---|---|
| A | | RECOGNITION DETECTION(1) | RECOGNITION DETECTION(2) | RECOGNITION DETECTION(3) | RECOGNITION DETECTION(4) | RECOGNITION DETECTION(5) | T |
| B | | DETECTION(0) | RECOGNITION DETECTION(1) | DETECTION(3) | DETECTION(3) | DETECTION(5) | |
| C | | DETECTION(1) | DETECTION(2) | DETECTION(3) | DETECTION(4) | DETECTION(5) | |
| D | | DETECTION(1) | DETECTION(2) | DETECTION(3) | DETECTION(4) | DETECTION(6) | |
| E | DETECTION(0) | | DETECTION(3) | DETECTION(4) | | DETECTION(6) | |
| FIRST DETECTION AND RECOGNITION PERIOD | ←2T→ | ←3T→ | | | | | |
| SECOND DETECTION AND RECOGNITION PERIOD | | ←2T→ | ←3T→ | | | | |
| THIRD DETECTION AND RECOGNITION PERIOD | | | ←2T→ | ←3T→ | | | |

FIG. 8

| | FREQUENCY OF FACE DETECTION PROCESSING | | | FREQUENCY OF RECOGNITION PROCESSING | | |
|---|---|---|---|---|---|---|
| | CONVENTIONAL ART | FIRST EMBODIMENT | SECOND EMBODIMENT | CONVENTIONAL ART | FIRST EMBODIMENT | SECOND EMBODIMENT |
| SEGMENTED IMAGE A | 3 | 0 | 5 | 3 | 5 | 5 |
| SEGMENTED IMAGE B | 3 | 3 | 5 | 3 | 2 | 2 |
| SEGMENTED IMAGE C | 3 | 5 | 5 | 0 | 0 | 0 |
| SEGMENTED IMAGE D | 3 | 5 | 5 | 0 | 0 | 0 |

IMAGE PROCESSING APPARATUS AND IMAGE PROCESSING METHOD

BACKGROUND OF THE INVENTION

1. Field of the Invention

The present invention relates to an image processing apparatus and an image processing method, and more particularly, to a technology preferably used to detect a face of a person from image data and perform recognition processing for identifying a person of the detected face.

2. Description of the Related Art

As discussed in Japanese Patent Application Laid-Open No. 2008-271310, a configuration is known for detecting a face of a person from image data and performing recognition processing for identifying a person of the detected face.

In addition, there is a known image processing apparatus configured to segment high resolution image data into a plurality of image data and to process the segmented image data in parallel. For example, as discussed in Japanese Patent Application Laid-Open No. 2000-253397, a configuration is known for controlling parameters in parallel in an encoding process.

By combining such techniques, a configuration may be conceivable, in which the high resolution image data is segmented, and recognition processing for identifying a person is performed in parallel for the respective segmented image data. In such an image processing apparatus, recognition processing for different persons can be made among the respective segmented image data. Therefore, it is possible to reduce a time taken for the recognition processing for all persons included in the image data before the segmentation.

However, if the recognition processing is performed on overall segmented image data at the same timing, it may be sometimes difficult to effectively reduce the time taken for the recognition processing. For example, in a moving picture containing image data of a plurality of frames, it is assumed that a person appears in any segmented image data at the timing of the face detection processing just before the start of the recognition processing. In addition, it is assumed that a person appears in another segmented image data slightly later than the timing of the face detection processing just before the start of the recognition processing. In this case, since the face detection processing and the recognition processing are performed for the first person as soon as he/she appears on a screen, it is possible to identify the person with a small time loss. However, in the case of the later person, the person is identified in the next recognition processing after the image is displayed, and then the first recognition processing is completed. Therefore, a much time loss is produced in waiting for completion of the first recognition processing.

In this manner, if the recognition processing is applied to a plurality of segmented image data at the same timing, the time taken until the recognition processing is completed after the person appears may increase in comparison with the person who appears in other segmented image data.

SUMMARY OF THE INVENTION

The invention provides an image processing apparatus and an image processing method capable of suitably controlling timing for executing face detection processing and recognition processing for identifying a person of the detected face for segmented image data.

According to an aspect of the invention, there is provided an image processing apparatus including a segmentation unit configured to segment image data into a plurality of segments to create a plurality of segmented image data, a detection unit configured to execute face detection processing for detecting a face area from image data before being segmented and each of the plurality of segmented image data, a recognition unit configured to execute recognition processing for determining whether the face detected by the detection unit is a face of a registered person, in each of the plurality of segmented image data, and a control unit configured to control whether to cause the recognition unit to execute the recognition processing is as to each of the plurality of segmented image data depending on a result of detection of a face in the image data before being segmented.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the identification, illustrate exemplary embodiments, features, and aspects of the invention and, together with the description, serve to explain the principles of the invention.

FIG. 3B is a diagram illustrating a state that the image data is segmented into four segmented image data A to D corresponding to four areas in FIG. 3A.

FIG. 7A is a diagram illustrating with time the timing for executing the face detection processing and the recognition processing of the conventional art.

FIG. 7B is a diagram illustrating timing for executing the recognition processing of the image processing apparatus according to the first exemplary embodiment of the invention.

FIG. 7C is a diagram illustrating timing for executing the recognition processing of the image processing apparatus according to the first exemplary embodiment of the invention.

FIG. 8 is a diagram illustrating frequencies of the face detection processing and the recognition processing within a predetermined period.

DESCRIPTION OF THE EMBODIMENTS

Various exemplary embodiments, features, and aspects of the invention will be described in detail below with reference to the drawings.

Figure 1:
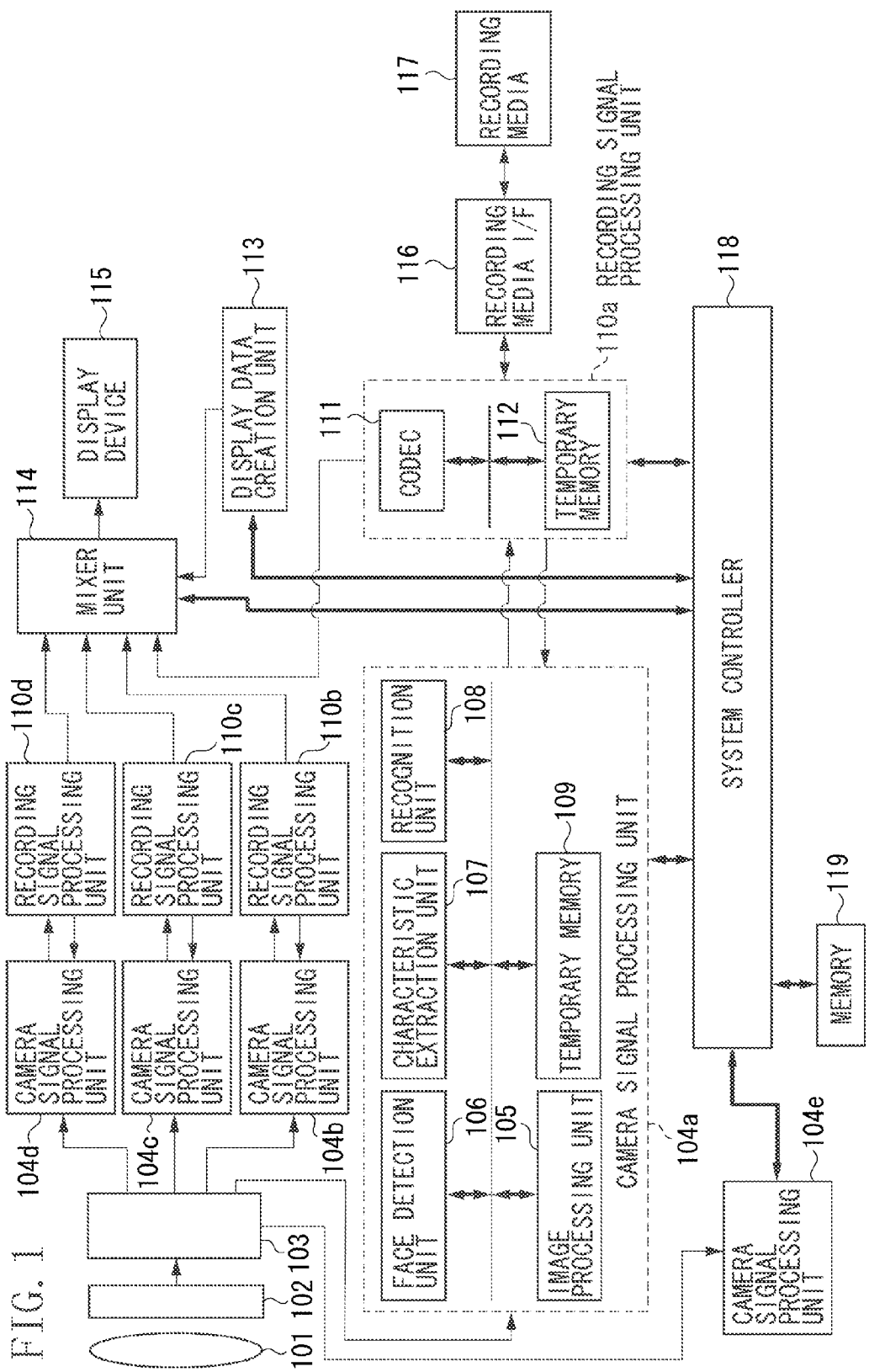
FIG. 1 is a block diagram illustrating a configuration example of an imaging apparatus as an exemplary image processing apparatus according to an exemplary embodiment of the invention.

Hereinafter, exemplary embodiments of the invention will be described. FIG. 1 is a block diagram illustrating a configuration example of the imaging apparatus as an exemplary image processing apparatus according to a first exemplary embodiment of the invention.

Referring to FIG. 1, the image sensor 102 is a CCD or CMOS sensor which receives object light passing through a lens 101 and creates image data. The multiplexer unit 103 performs reduction and segmentation of the image data read by the image sensor 102 and outputs reduced image data and segmented image data. The camera signal processing units 104a, 104b, 104c, 104d, and 104e constitute a camera signal processing group and perform the signal processing described below for either the input reduced image data or the input segmented image data.

The image processing unit 105 performs various processing such as noise reduction, gamma correction, luminance signal correction, or color-difference signal correction for the input image data. The face detection unit 106 performs face detection processing for detecting faces in the image data, and the characteristic extraction unit 107 extracts characteristics from the face detected by the face detection unit 106. The recognition unit 108 compares the characteristics extracted by the characteristic extraction unit 107 and characteristics registered in the temporary memory 109 in advance to determine whether a person of the detected face is a registered person. More specifically, the characteristic extraction unit 107, the recognition unit 108, and the temporary memory 109 perform recognition processing for identifying a person of the face detected by the face detection unit 106. The temporary memory 109 may temporarily store the characteristics used by the recognition unit 108, the image data necessary in each processing performed by the image processing unit 105, the face detection unit 106, and the characteristic extraction unit 107, or information created during the processing.

The camera signal processing units 104a to 104e are connected to and controlled by a system controller 118 (connection between the camera signal processing units 104b to 104e and the system controller 118 is not shown). The recording signal processing units 110a, 110b, 110c, and 110d constitute a recording signal processing group and perform an encoding processing on the input image data and the decoding processing on the input data.

The codec unit 111 performs an encoding processing for encoding the image data into recording data having a predetermined format and a decoding processing for decoding the recording data into the image data. The temporary memory 112 temporarily stores the data used in the encoding processing and the decoding processing. The recording signal processing units 110a to 110d are connected to and controlled by the system controller 118 (connection between the recording signal processing units 110b to 110d and the system controller 118 is not shown).

The display data creation unit 113 creates various kinds of information indicating device states or display data for implementing a graphical user interface and outputs it to the mixer 114. The mixer 114 combines the image data output from the recording signal processing group and the display data from the display data creation unit 113. The display device 115 includes a display panel such as an LCD or an organic EL and displays the image data output from the mixer 114.

The recording data stored in the recording media 117 is read/written by the recording signal processing units 110a to 110d through the recording media interface 116. The system controller 118 controls each of the camera signal processing group, the recording signal processing group, the display data creation unit 113, and the mixer 114. The memory 119 stores various kinds of information of the imaging apparatus including the registered recognition information. The recognition information stored in the memory 119 includes characteristic information of the face, personal identification information uniquely allocated to the person, and name information such as a name or nickname of the person, and different recognition information is prepared for each person. Among the recognition information of persons stored in the memory 119, the recognition information corresponding to the required person is read by the temporary memory 109 and is used in the recognition processing by the recognition unit 108.

Next, a signal flow during the imaging process will be described with reference to FIGS. 1 to 3.

Figure 2:
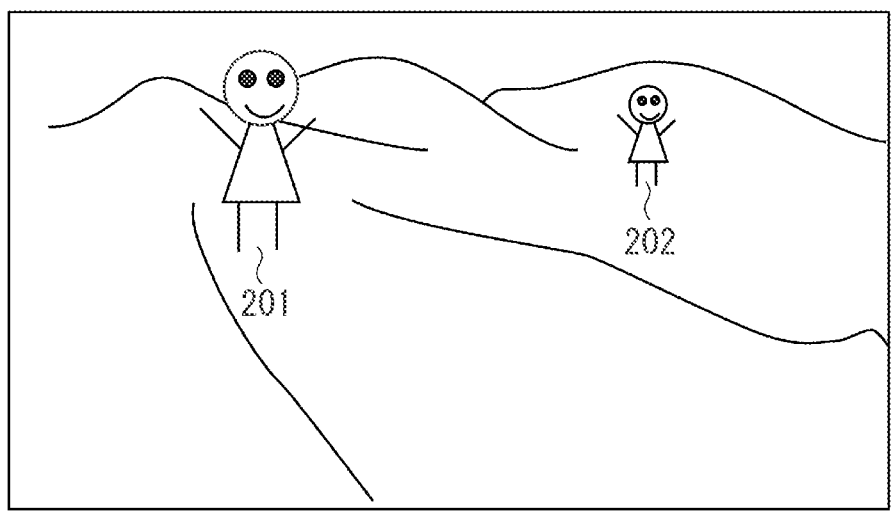
FIG. 2 is a diagram illustrating image data of a single frame of a moving picture input to the multiplexer unit as the image data before the segmentation.
Figure 3A:
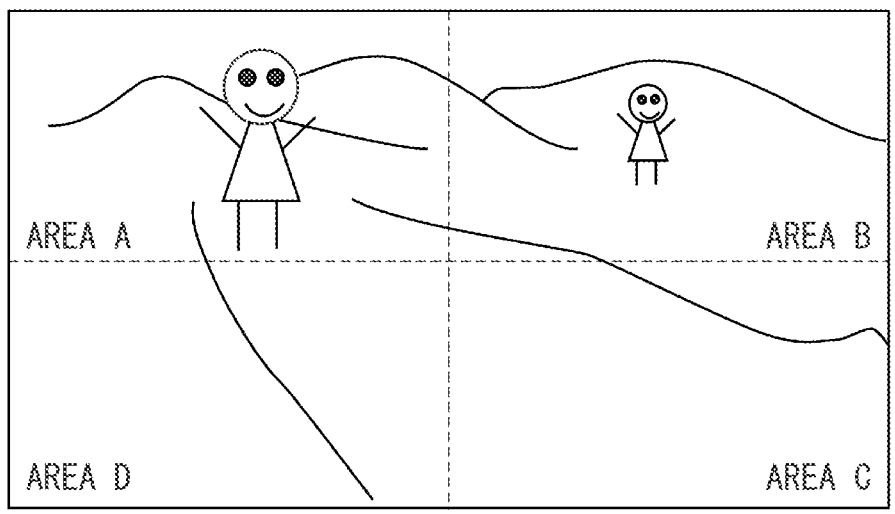
FIG. 3A is a diagram illustrating a state that the image data in FIG. 2 is segmented into four areas.
Figure 3C:
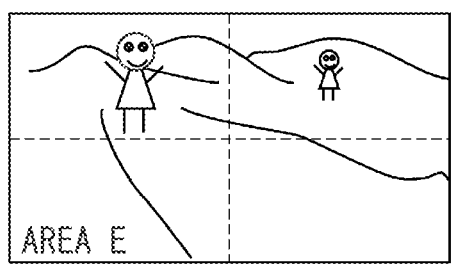
FIG. 3C is a diagram illustrating reduced image data E obtained by reducing the image data in FIG. 2.

FIG. 2 is a diagram illustrating image data of a single frame of a moving picture input to the multiplexer unit 103 before the segmentation. FIG. 3A is a diagram illustrating the image data in FIG. 2 which is segmented into four areas. FIG. 3B is a diagram illustrating the image data which is segmented into four image data A to D corresponding to the four areas in FIG. 3A. FIG. 3C is a diagram illustrating the reduced image data E obtained by reducing the image data in FIG. 2.

The light passing through the lens 101 is photoelectrically converted in the image sensor 102. The image sensor 102 has a number of pixels necessary to output four or more than four times as much an amount of the image data as the high definition television (HDTV) and outputs the created image data to the multiplexer unit 103. In the multiplexer unit 103, the processing is performed for every single frame of the image data.

In the multiplexer unit 103, among the input image data, first, the image including 4098 horizontal pixels and 2196 vertical pixels as effective pixels in FIG. 2 is segmented into four areas as illustrated in FIG. 3A. Furthermore, as illustrated in FIG. 3B, four segmented image data corresponding to the four areas are created. As illustrated in FIG. 3A, the segmented image data are set to segmented image data A, B, C, and D from the upper left corner in a clockwise direction.

The segmented image data A, B, C, and D are input to the camera signal processing units 104a, 104b, 104c, and 104d, respectively. At the same time, the multiplexer unit 103 reduces the image data of 4098 horizontal pixels and 2196 vertical pixels in FIG. 2 to ¼ to be equal to the size of the segmented image data and create the reduced image data E in FIG. 3C. The reduced image data E is input to the camera signal processing unit 104e.

The camera signal processing group performs various signal processing such as noise reduction, gamma correction, luminance signal correction, or color-difference signal correction on the segmented image data or the reduced image data. The segmented image data and the reduced image data are stored in the temporary memory 109, and the image processing is performed by the image processing unit 105.

The image data processed by the image processing unit 105 is input to the recording signal processing group. The segmented image data and the reduced image data after the image processing are temporarily stored in the temporary memory 112 and are encoded into a predetermined format using the codec unit 111. The encoded image data is written to the recording media 117 through the recording media interface 116. The connection between the recording signal processing units 110b to 110d and the recording media interface 116 is not shown.

In addition, each image data output from the recording signal processing group is input the mixer 114. In the mixer 114, the four segmented image data are combined in synchronization with the recording signal processing group to create combined image data having the same angle of view as the image data before the segmentation. The combined image data becomes an image of 4098 horizontal pixels and 2196 vertical pixels. The combined image data is converted into a size and a format suitable for the display resolution of the display device 115 and is used to display an image on the display device 115.

The system controller 118 notifies the display data creation unit 113 of the information regarding the status of the imaging apparatus. The display data creation unit 113 creates display data including texts or icons for informing a user of the status of the apparatus based on the notified information. The mixer 114 overlaps the display data with the combined image data, and the overlapped combined image data is output to the display device 115.

Next, the face detection processing and the recognition processing will be described.

The face detection unit 106 detects a face of the person included in the image signal input to the camera signal processing units 104a to 104e. When the face is detected, the face detection unit 106 creates positional information of the face area in the image data. The characteristic extraction unit 107 creates the characteristic information of the face necessary in the recognition of a person from, the detected face area. As such characteristic information, for example, information about a shape of eyebrows, eyes, a nose, a mouse and their arrangement is extracted.

The recognition unit 108 compares the characteristic information of the created face information and the registered characteristic information stored in the memory 119 and generates recognition result indicating whether the detected face is a registered face based on similarity between the information. The recognition processing is performed on the image data of a plurality of frames, and it is determined that the person of the corresponding face is a registered person if the similarity to the same registered characteristic information exceeds a predetermined threshold predetermined times.

The system controller 118 also controls operations of the face detection unit 106, the characteristic extraction unit 107, and the recognition unit 108. For example, the system controller 118 switches the threshold for identifying a registered person depending on the imaging condition. Further, the system controller 118 switches a person whose characteristic information is compared if the registered characteristic information regarding a plurality of registered persons is provided. For example, since it takes a long time if the recognition processing is performed using all pieces of the registered characteristic information, the system controller 118 causes a user in advance to select characteristic information which is used and performs the recognition processing using the characteristic information of the selected person. If the information is not selected by a user, the recognition processing may be performed using all pieces of the registered characteristic information.

In addition, the system controller 118 manages the registered characteristic information. If it is determined that the characteristic information of the detected face is not similar to any registered characteristic information, the system controller 118 performs control such that the characteristic information extracted from this face is newly stored in the memory 119 as the registered characteristic information for this person. In addition, the system controller 118 automatically deletes the registered characteristic information which has not been used for a long time and is determined as unnecessary. In addition, for the purpose of information protection, the characteristic information may be encrypted when it is written and decrypted at the time of reading.

Next, the operation of the system controller 118 when the object is captured will be described by way of example.

The image in FIG. 2 contains a person 201 (hereinafter, referred to as a person A) and a person 202 (hereinafter, referred to as a person B). Since the person A is located in the vicinity of the imaging apparatus compared to the person B, the person A appears to be larger. The characteristic information for recognizing the persons A and B has been already registered in the memory 119.

First, the camera signal processing unit 104e performs the face detection processing on the reduced image data E and outputs its result. Since a threshold indicating the minimum detectable face size is defined in the camera signal processing units 104a to 104e, it is difficult to detect the face of the size equal to or smaller than the threshold. The face of the person A is larger than the threshold in both the unreduced original image data and the reduced image data E. On the other hand, the face of the person B is larger than the threshold in the original image data, but is smaller than the threshold in the reduced image data E. For this reason, although the face of the person A is detected from the reduced image data E, the face of the person B is not detected. As a result, the system controller 118 receives the detection result indicating that a single face exists in the reduced image data E and the information indicating the size and the position of the corresponding face from the camera signal processing unit 104e. Furthermore, the system controller 118 determines that the corresponding face is included in the segmented image data A based on the information indicating the size and the position of the face.

Next, the system controller 118 instructs the camera signal processing unit 104a which processes the segmented image data A to perform recognition processing. The characteristic extraction unit 107 of the camera signal processing unit 104a extracts characteristic information of the face from the area corresponding to the face area detected in the reduced image data E among the segmented image data A. Then, the person is identified by comparing the extracted characteristic information and the registered characteristic information by the recognition unit 108. In this manner, the system controller 118 performs control such that, when the face is detected from the reduced image data E, the camera signal processing unit, where the segmented image data corresponding to the position of the corresponding face is input, does not perform the face detection processing but performs the recognition processing. More specifically, as long as the face is successively detected from the reduced image data E, the camera signal processing unit where the segmented image data corresponding to the position of the corresponding face is input does not perform the face detection processing and performs the recognition processing successively.

The system controller 118 instructs each of the camera signal processing units 104b to 104d that processes the segmented image data B to D, to perform no recognition processing but the face detection processing. Although the face size of the person B is smaller than the threshold in the reduced image data E, the face size of the person B is larger than the threshold in the segmented image data B. For this reason, the face detection unit 106 of the camera signal processing unit 104b can detect the face area from the segmented image data B. Therefore, in the camera signal processing unit 104b, the characteristic extraction unit 107 extracts the characteristic information as to the detected face area for the segmented image data B of the frame obtained thereafter, and the recognition unit 108 performs the recognition processing by comparing the extracted characteristic information and the registered characteristic information.

In this manner, the system controller 118 repeatedly controls the camera signal processing unit, which receives the segmented image data corresponding to the area in which the face is not detected, from the reduced image data E, to perform the face detection processing and then the recognition processing when the face is detected. If the face is not detected even when the face detection processing is performed, the face detection processing is performed again.

In addition, since a person does not exist in the segmented image data C and D, the camera signal processing units 104c and 104d repeat the face detection processing until a person appears in the segmented image data C and D which makes the face detection processing successful.

If a face having a detectable size appears in the area corresponding to any one of the segmented image data B to D of the reduced image data E, the camera signal processing unit which receives the segmented image data corresponding to the position of the corresponding face does not perform the face detection processing and performs the recognition processing.

Figure 4:
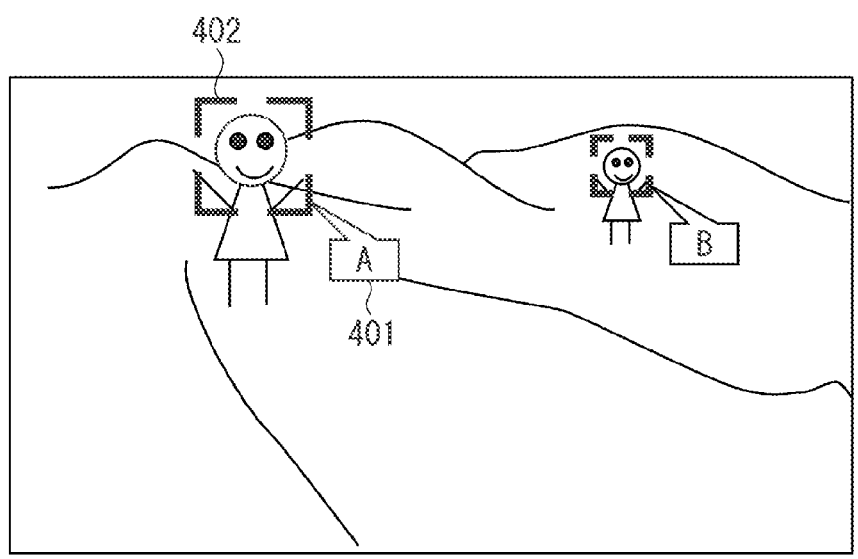
FIG. 4 is a diagram illustrating a result of the face detection processing and a result of the recognition processing displayed on the display unit.

If the recognition unit 108 performs the recognition processing and successfully identifies a person, the system controller 118 obtains name information corresponding to the personal identification information for the identified person. Then, the system controller 118 causes the display data creation unit 113 to process the obtained information, and the display device 115 displays the name along with the image data. At the same time, the face frame is displayed as information indicating a fact that the face is detected. FIG. 4 is a diagram illustrating a result of the face detection processing and a result of the recognition processing displayed on the display device. As to the persons A and B whose faces are successfully detected, a face frame 402 indicating the position and the size of the detected face is displayed and a name indication 401 is provided for the identified person.

As a result, a user can recognize a person who is detected and know who he is based on the scene currently displayed on the screen. In this manner, the system controller 118 performs the face detection processing for the reduced image data E and then performs control to decide whether the face detection processing or the recognition processing is performed for each of the segmented image data A to D based on the detection result.

Next, description will be made about switching control between the face detection processing and the recognition processing performed for the camera signal processing group of the system controller 118 according to the present exemplary embodiment with reference to the flowcharts in FIGS. 5 and 6.

Figure 5:
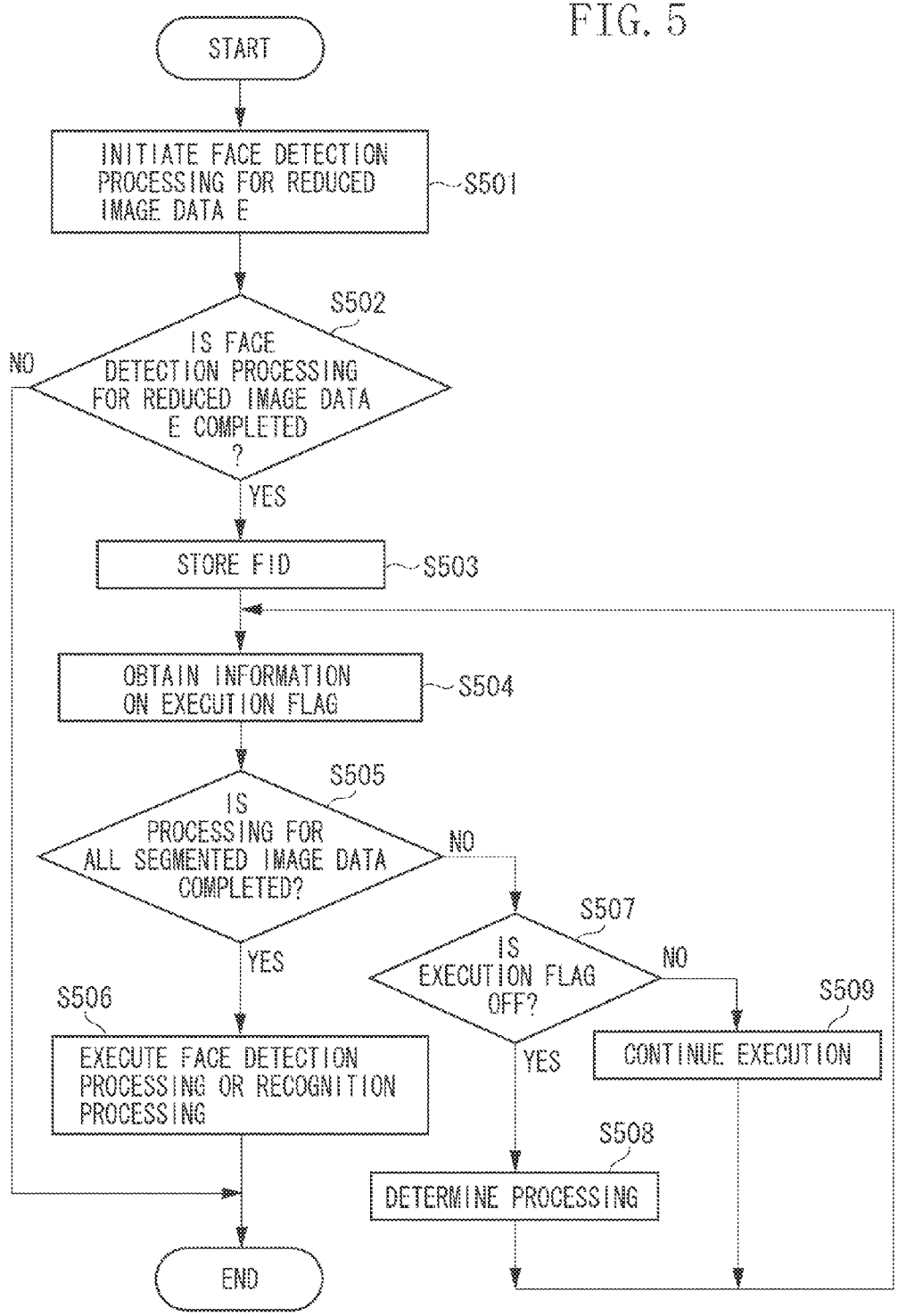
FIG. 5 is a flowchart illustrating a control sequence of the face detection processing and the recognition processing.

FIG. 5 is a flowchart illustrating a control sequence of the face detection processing and the recognition processing. FIG. 6 is a flowchart illustrating switching control between the face detection processing and the recognition processing of the image processing apparatus according to the first exemplary embodiment of the invention.

According to the present exemplary embodiment, it is assumed that each of the camera signal processing units 104a to 104e cannot perform the face detection processing in parallel with the recognition processing; in other words, when one of the face detection processing and the recognition processing is performed, the other is not performed.

In step S501 in FIG. 5, the system controller 118 instructs the camera signal processing unit 104e to perform the face detection processing repeatedly using the reduced image data E created by the multiplexer unit 103. The camera signal processing unit 104e sets a face detection completion flag to be ON each time the face detection processing is completed for the reduced image data E of a single frame.

In step S502, the system controller 118 determines whether the face detection processing for the reduced image data E is completed by the camera signal processing unit 104e based on the face detection completion flag. The system controller 118 advances the process to step S503 if the face detection processing is completed, and the process returns to the start of the flowchart in FIG. 5 if the face detection processing is not completed.

In step S503, the system controller 118 stores the frame identification information (FID) for identifying the frame for which the face detection processing has been completed by the camera signal processing unit 104e. When the face detection processing is newly completed, the information indicating such a frame is stored as the FID, and the information indicating the frame stored as the previous FID is stored as the previous frame identification information LFID. The system controller 118 updates the FID and the LFID each time the face detection processing for the new frame is completed by the camera signal processing unit 104e. When the process of storing and updating the frame identification information is terminated, the process advances to step S504.

In step S504, the system controller 118 obtains information regarding an execution flag indicating whether the face detection processing or the recognition processing for each segmented image corresponding to the frame indicated by the LFID is being executed from each of the camera signal processing units 104a to 104d. If the process of obtaining the execution flag information is completed, the process advances to step S505.

In step S505, the system controller 118 determines whether a determination flag of the face detection processing or the recognition processing is set to be ON in step S508 described below for the camera signal processing units 104a to 104d which receives the segmented image data A to D corresponding to the FID stored in step S503. The system controller 118 performs control such that the process advances to step S506 if it is determined that all determination flags of the camera signal processing units 104a to 104d are set to be ON, and the process advances to step S507 if it is determined that any one of determination flags is not set to be ON.

In step S506, the system controller 118 performs control to execute the face detection processing or the recognition processing for the camera signal processing units 104a to 104d depending on the determination made in step S508 described below. In addition, the system controller 118 performs control such that the determination flags of the camera signal processing units 104a to 104d are set to be OFF, the face detection completion flag of the camera signal processing unit 104e is set to be OFF, and the execution flag is set to be ON. The execution flag is set for each of the camera signal processing units 104a to 104d and is set to be ON only while the corresponding camera signal processing unit is performing the face detection processing or the recognition processing.

In step S507, out of the camera signal processing units 104a to 104d, the system controller 118 selects the camera signal processing unit in which the determination flag described below is set to be OFF and checks the execution flag of the camera signal processing unit. The system controller 118 advances the process to step S508 for the camera signal processing unit in which the execution flag is set to be OFF, and the process advances to step S509 for the camera signal processing unit in which the execution flag is set to be ON.

In step S508, the system controller 118 determines whether the face detection processing or the recognition processing is executed for the camera signal processing unit in which both the determination flag and the execution flag are set to OFF and sets the determination flag of the corresponding camera signal processing unit to be ON. Then, the process advances to step S504.

In step S509, the system controller 118 causes the camera signal processing unit to continue the execution of the face detection processing or the recognition processing being executed, and the process advances to step S504.

Then, the processing of step S508 will be described with reference to the flowchart in FIG. 6. The system controller 118 individually determines whether the face detection processing or the recognition processing is executed for each of the camera signal processing unit 104a to 104d. Although the processing for the camera signal processing unit 104a is described as an example, the similar processing is performed for other camera signal processing units 104b to 104d.

In step S601, the system controller 118 receives information indicating the size and the position of the face from the camera signal processing unit 104e and determines whether a face is detected from the area corresponding to the segmented image data A of the reduced image data E. If it is determined that a face is not detected, the process advances to step S606. Otherwise, if it is determined that a face is detected, the process advances to step S602.

In step S602, the system controller 118 selects information indicating the size of the face of the area corresponding to the segmented image data A out of the information indicating the sizes of faces obtained from the reduced image data E. The system controller 118 obtains the size of the face in the segmented image data A by multiplying the size of the selected face by a reciprocal number of the reduction ratio of the reduced image data E, and the process advances to step S603. In addition, if a plurality of faces is detected from the segmented image data A, the system controller 118 multiplies a sum of the sizes of faces by a reciprocal number of the reduction ratio of the reduced image data E.

In step S603, the system controller 118 computes a ratio between the area of the face included in the segmented image data A computed in step S602 and the area of the segmented image data A and obtains a ratio of the face area in the segmented image data A. If the ratio of the face area is equal to or higher than a threshold, in other words, if the ratio occupied by the face within the screen is high, the system controller 118 determines that there is a low possibility that other detectable faces exist in the remaining areas, and the process advances to step S604. Otherwise, the process advances to step S605.

In step S604, the system controller 118 instructs the camera signal processing unit 104a to perform the recognition processing for the target segmented image data A, and the process advances to step S504 in FIG. 5. The target segmented image data A is the segmented image data created from the image data of the frame corresponding to a predetermined cycle of a moving picture, and is the image data obtained after a single cycle from the frame indicated by the FID for which the face detection processing has been performed by the camera signal processing unit 104e. The system controller 118 correlates the segmented image data A with the information indicated by the FID.

If the process advances from step S603 to step S604, the camera signal processing unit 104a determines the area for extracting the characteristic information using the information indicating the size and the position of the face created by the camera signal processing unit 104e. On the contrary, if the process advances from step S603 through step S605 described below to step S604, the camera signal processing unit 104a determines the area for extracting the characteristic information using the information indicating the size and the position of the face just previously created by the camera signal processing unit 104a.

In step S605, the system controller 118 determines whether the face detection processing has been performed just previously, using the segmented image data A. If it is determined that the face detection processing is performed just previously, the process advances to step S604. Otherwise, the process advances to step S606.

In step S606, the system controller 118 instructs the camera signal processing unit 104a to perform the face detection processing of the target segmented image data A, and the process advance to step S504 in FIG. 5. If a face is successfully detected, the camera signal processing unit 104a creates information indicating the size and the position of the corresponding face.

Figure 6:
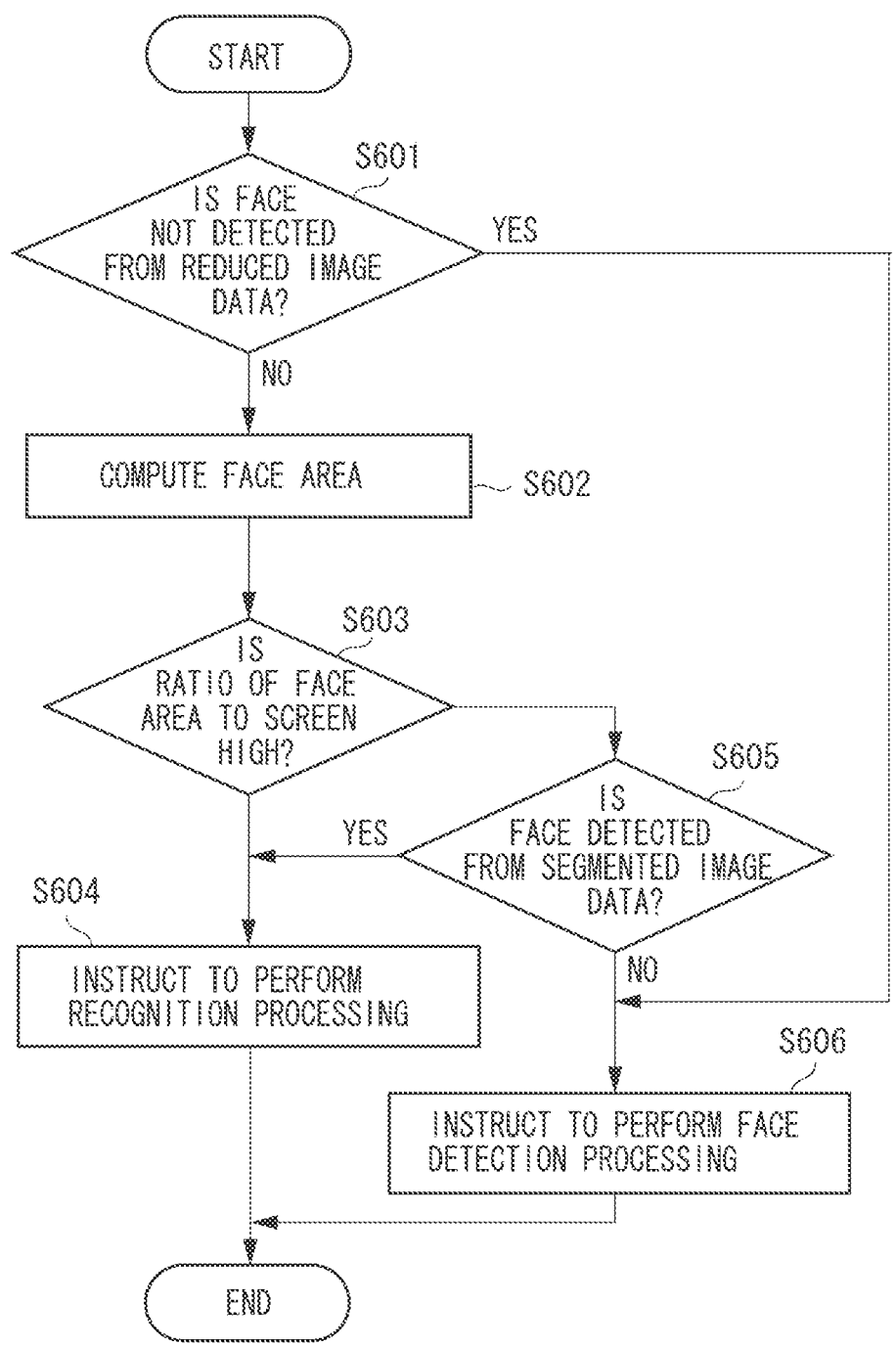
FIG. 6 is a flowchart illustrating a switching control between the face detection processing and the recognition processing of the image processing apparatus according to a first exemplary embodiment of the invention.

The flowchart in FIG. 6 is just an example, and steps S602, S603, and S605 may not be performed, for example. More particularly, the recognition processing may be executed to the segmented image data corresponding to the area where the face is detected in the reduced image data E, and the face detection processing may be executed to the segmented image data corresponding to the area where the face is not detected in the reduced image data E.

Next, a recognition rate according to the first exemplary embodiment of the invention will be described.

FIG. 7A is a diagram illustrating execution timing of the face detection processing and the recognition processing of the conventional art, with time. FIG. 7B is a diagram illustrating execution timing of the face detection processing and the recognition processing with time according to the first exemplary embodiment of the invention. The face detection processing and the recognition processing are executed in synchronization with a predetermined operational cycle T. FIG. 8 is a diagram illustrating frequencies of the face detection processing and the recognition processing performed within a predetermined period.

In the method of the conventional art, as illustrated in FIG. 7A, for four input segmented image data A to D, four camera signal processing units execute the face detection processing and the recognition processing by switching therebetween in the same cycle.

In FIG. 7A, the camera signal processing group executes the face detection processing in the initial cycle T and executes the recognition processing only to the segmented image data in which a face is successfully detected in the next cycle T. Therefore, if a person exists in both the segmented image data A and the segmented image data B respectively as illustrated in FIG. 3B, identification of these two persons is completed within two cycles 2T after the start of the detection. In addition, a series of processing for combining the face detection processing and the recognition processing are performed with a period of 2T at all times. Therefore, as illustrated in FIG. 8, in a period of 6T, the face detection processing and the recognition processing are performed three times for the segmented image data A and B, and only the face detection processing is performed three times for the segmented image data C and D.

In comparison, according to the first exemplary embodiment described above, the system controller 118 determines whether the face detection processing or the recognition processing is executed for each of the camera signal processing units 104a to 104d based on a result of the face detection processing by the camera signal processing unit 104e. As illustrated in FIG. 7B, in the segmented image data A where a large-sized face exists, the process waits for the face detection processing from the reduced image data E by the camera signal processing unit 104e only in the initial cycle T. However, thereafter, since the camera signal processing unit 104a can perform the recognition processing in each cycle using the information indicating the size and the position of the face obtained a single cycle before from the reduced image data E, it is possible to perform the recognition processing in every cycle T. Therefore, the recognition processing is performed five times within a period of 6T as illustrated in FIG. 8.

In addition, for the segmented image data B where a small-sized face exists, the face is not detected from the area corresponding to the segmented image data B of the reduced image data E. Therefore, the camera signal processing unit 104b alternately performs the face detection processing and the recognition processing on the segmented image data B. Accordingly, if a period for waiting for the initial face detection processing as to the reduced image data E performed by the camera signal processing unit 104e is included, the face detection is performed three times, and the recognition processing is performed two times within a period of 6T as illustrated in FIG. 8.

Further, since a face does not exist in the segmented image data C and D, the camera signal processing units 104c and 104d perform the face detection processing at all times excluding a period for waiting for the initial face detection processing as to the reduced image data E performed by the camera signal processing unit 104e. Therefore, the face detection processing is performed five times within a period of 6T as illustrated in FIG. 8.

With respect to the person A who is close to the imaging apparatus, and whose face is large in size, a frequency of the recognition processing increases compared to the conventional art. For the person B who is distant from the imaging apparatus, and whose face is small in size, the process waits for the face detection processing as to the reduced image data E only in an initial single cycle. In the subsequent cycles, the recognition processing is executed with the same frequency as the conventional art. If this person B gets closer to the imaging apparatus, and the size of the detected face increases, the frequency of the recognition processing for the person B increases similar to the person A.

In the area where a face does not exist, the face detection processing is performed in every cycle. Therefore, in comparison with the conventional art, a frequency of the face detection processing increases. Therefore, when a face appears in such an area, it is possible to detect the face immediately.

In the conventional art, as to the segmented image data corresponding to the area where a face does not exist, there is a cycle in which both the face detection processing and the recognition processing are not performed. However, according to the present exemplary embodiment, since one of the processing is always performed, an efficient control can be carried out compared to the conventional art.

Hereinafter, a second exemplary embodiment of the invention will be described. The imaging apparatus according to the second exemplary embodiment of the invention has a configuration similar to the imaging apparatus according to the first exemplary embodiment. The imaging apparatus according to the second exemplary embodiment is different from the imaging apparatus according to the first exemplary embodiment in that each face detection unit 106 of the camera signal processing units 104a to 104d has an upper limit of the face size in detecting the face and the recognition unit 108 has a lower limit of the face size in recognizing the face. Further, the imaging apparatus according to the second exemplary embodiment is also different from the imaging apparatus according to the first exemplary embodiment in that both the face detection processing and the recognition processing are executed in parallel for the segmented image data.

Each face detection unit 106 of the camera signal processing units 104a to 104d performs a process of detecting from each segmented image data A to D the face having a size that is not detectable from the reduced image data E. In other words, in such a face detection unit 106, an upper limit is set to the size of the face to be detected. The upper limit of the size of the face is set to be larger than the lower limit of the size of the face to be recognized by the recognition unit 108. Accordingly, if there is a face having a size larger than such a lower limit among the faces having the size that is not detectable from the reduced image data E but is detectable from the segmented image data A to D, the recognition unit 108 can recognize the face.

The system controller 118 causes the camera signal processing units 104a to 104d to execute the face detection processing as to the segmented image data A to D in each cycle. In addition, the system controller 118 determines whether the recognition processing for the segmented image data A to D is to be executed according to the face detection result of the reduced image data E a single cycle before.

The system controller 118 controls the face detection processing and the recognition processing according to the flowchart in FIG. 5. However, a method for determining the processing which is executed to the camera signal processing unit in step S508 is different from the first exemplary embodiment.

Figure 9:
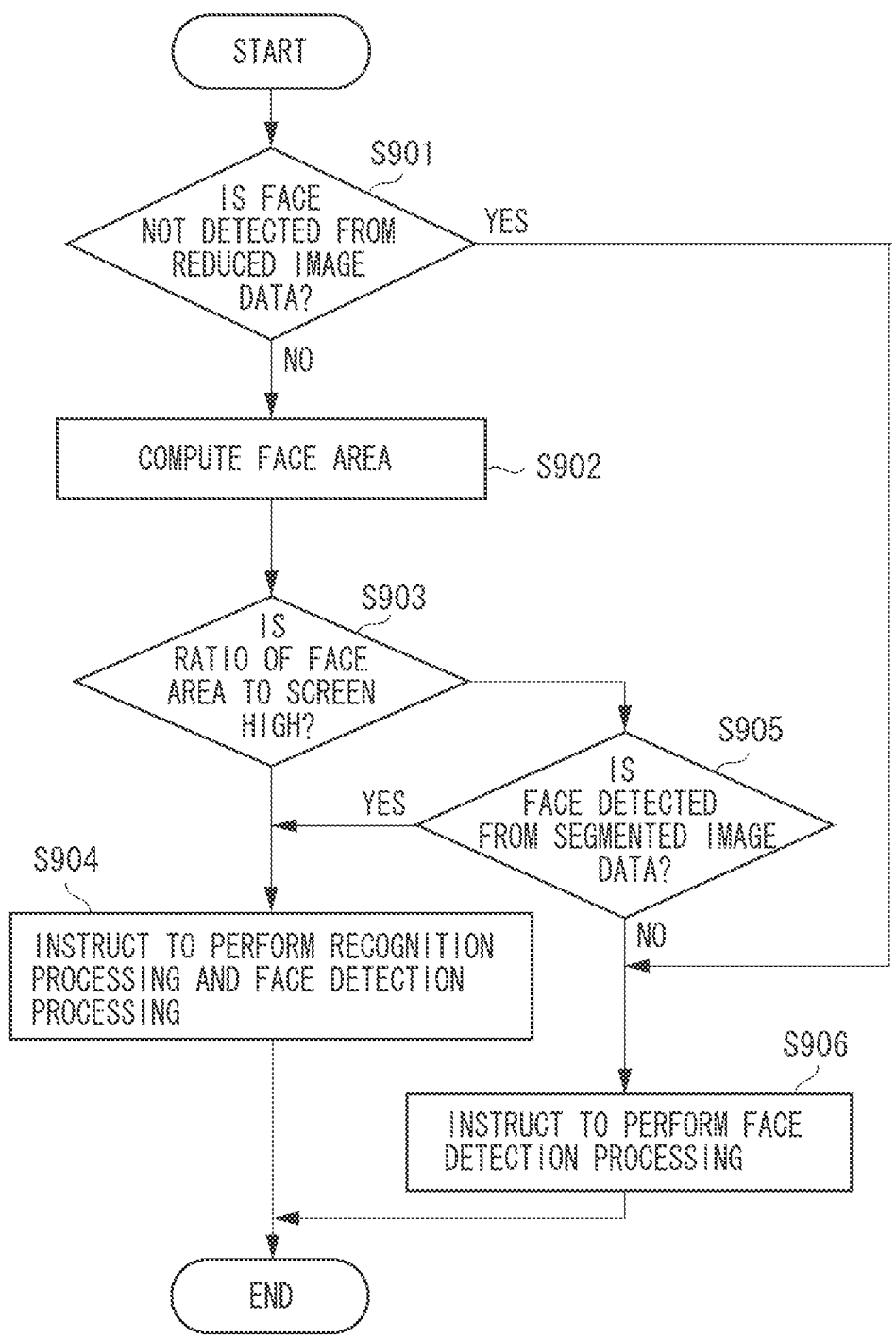
FIG. 9 is a flowchart illustrating a switching control between the face detection processing and the recognition processing in the image processing apparatus according to a second exemplary embodiment of the invention.

The processing of step S508 according to the second exemplary embodiment will be described with reference to the flowchart in FIG. 9. The system controller 118 individually determines whether only the face detection processing is executed or both the face detection processing and the recognition processing are executed in parallel, for each of the camera signal processing units 104a to 104d. Although the processing for the camera signal processing unit 104a is described as an example, the processing may be similarly performed on other camera signal processing units 104b to 104d.

In step S901, the system controller 118 receives information indicating the size and the position of the face from the camera signal processing unit 104e and determines whether a face is detected from the area corresponding to the segmented image data A of the reduced image data E. If it is determined that the face is not detected, the process advances to step S906. If it is determined that the face is detected, the process advances to step S902.

In step S902, the system controller 118 selects information indicating the size of the face in the area corresponding to the segmented image data A out of the information indicating the size of the face obtained from the reduced image data E. The system controller 118 obtains the size of the face in the segmented image data A by multiplying the size of the selected face by a reciprocal number of the reduction ratio of the reduced image data E, and the process advances to step S903. If a plurality of faces is detected in the segmented image data A, the system controller 118 multiplies a sum of the sizes of the corresponding faces by a reciprocal number of the reduction ratio of the reduced image data E.

In step S903, the system controller 118 computes a ratio between the area of the face included in the segmented image data A computed in step S902 and the area of the segmented image data A to obtain a ratio of the face area in the segmented image data A. If the ratio of the face area is equal to or higher than a threshold, in other words, if the ratio of the area occupied by the face in the screen is high, the system controller 118 determines that a possibility is low that there is a face having the size to be recognized by the recognition unit 108 in a rest of the area, and the process advances to step S904. Otherwise, the process advances to step S905.

In step S904, the system controller 118 instructs the camera signal processing unit 104a to perform both the face detection processing and the recognition processing in parallel on the target segmented image data A, and the process advances to step S504 in FIG. 5. Such a target segmented image data A is the segmented image data created from the image data of the frame corresponding to a predetermined cycle of a moving picture, and is the image data obtained a single cycle after from the frame indicated by the FID subjected to the face detection processing performed by the camera signal processing unit 104e. The system controller 118 correlates the frame information indicated by the FID with the segmented image data A.

If the process advances from step S903 to step S904, the camera signal processing unit 104a determines the area for extracting the characteristic information using the information indicating the size and the position of the face created by the camera signal processing unit 104e. On the contrary, if the process advances from step S903 through step S905 to step S904, the camera signal processing unit 104a determines the area for extracting the characteristic information using the information indicating the size and the position of the face created by the camera signal processing unit 104e and the information indicating the size and the position of the face created by the camera signal processing unit 104a. However, as the information indicating the size and the position of the face created by the camera signal processing unit 104a, only the information is used which indicates the size and the position of the face satisfying the a size condition, on which the recognition unit 108 can perform the recognition processing.

In step S905, the system controller 118 determines whether the face detection processing has been performed just previously on the segmented image data A. If it is determined that the face detection processing has been performed just previously, the process advances to step S904. Otherwise, the process advances to step S906.

In step S906, the system controller 118 instructs the camera signal processing unit 104a to perform the face detection processing on the target segmented image data A, and the process advances to step S504 in FIG. 5. If a face is successfully detected, the camera signal processing unit 104a creates information indicating the size and the position of the face.

Next, the recognition rate according to the second exemplary embodiment of the invention will be described with reference to FIGS. 7C and 8. FIG. 7C is a diagram illustrating with time the execution timing of the face detection processing and the recognition processing according to the second exemplary embodiment of the invention. The face detection processing and the recognition processing are executed in synchronization with a predetermined operational cycle T.

According to the second exemplary embodiment, the system controller 118 determines whether only the face detection processing is executed or both the face detection processing and the recognition processing are executed in parallel by each of the camera signal processing units 104a to 104d based on a result of the face detection processing of the camera signal processing unit 104e. As illustrated in FIG. 7C, for the segmented image data A where a large-sized face exists, the process waits for the face detection processing as to the reduced image data E by the camera signal processing unit 104e only in an initial period of T. However, thereafter, since the camera signal processing unit 104a can perform the recognition processing in each cycle using the information indicating the size and the position of the face obtained from the reduced image data E a single cycle before, it is possible to perform the recognition processing in every cycle T. Therefore, as illustrated in FIG. 8, the recognition processing is performed five times within a period of 6T.

As to the segmented image data B where a small-sized face exists, a face is not detected from the area corresponding to the segmented image data B of the reduced image data E. Therefore, the camera signal processing unit 104b performs the recognition processing after receiving the result of the face detection processing obtained from the segmented image data B. Therefore, considering the period for waiting for the initial face detection processing as to the reduced image data E performed by the camera signal processing unit 104e, the recognition processing is performed two times within a period of 6T as illustrated in FIG. 8.

Thus, similar to the first exemplary embodiment, as to the person A whose face size is large and who is close to the imaging apparatus, the frequency of the recognition processing increases compared to the conventional art. As to the person B whose face size is small and who is far distant from the imaging apparatus, the process waits for the face detection processing in the reduced image data E only in an initial single cycle. However, in the subsequent cycles, the recognition processing is executed with the same frequency as the conventional art. If the person B is close to the imaging apparatus, and the size of the detected face increases, the frequency of the recognition processing increases similar to the person A.

Since the face detection processing is performed in every cycle regardless whether the recognition processing is performed, the frequency of the face detection processing increases compared to the conventional art. Accordingly, it is possible to detect a face immediately after a face appears in the corresponding area.

Each face detection unit 106 of the camera signal processing units 104a to 104d performs the face detection processing in each cycle according to the present exemplary embodiment. However, a load of the face detection processing is alleviated because the upper limit of the size of the face to be detected is set.

In addition, according to the present exemplary embodiment, the recognition processing can be initiated at independent timing as to each segmented image data. Therefore, the process is completed without performing the unnecessary recognition processing. As a result, it is possible to reduce a time lag elapsed until the recognition result is obtained after a person appears in the segmented image data.

The exemplary embodiments of the invention have been described in detail hereinbefore. However, it should be understood that the invention includes not only the face detection processing and the recognition processing at the time of the imaging but also a case where the face detection processing and the personal recognition processing are executed at the time of image data reproduction after the recording. According to the exemplary embodiments described above, whether the recognition processing is executed is determined based on the information on whether a face exists and information on the size of the face. However, the invention is not limited thereto. For example, whether the face detection processing or the recognition processing is performed may be determined considering other kinds of information regarding the face obtained through the face detection, such as information on the distance to the face or a difference of the characteristic information of the face coming from the age.

Other Embodiments

In addition, the invention may be realized by executing the following processing. Software (computer program) capable of realizing the functions of the aforementioned exemplary embodiments may be supplied to a system or an apparatus through various kinds of computer readable storage medium or network, and a computer (CPU or MPU) of the system or the apparatus may read and execute the program.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-060547 filed Mar. 18, 2011, and No. 2012-035594 filed Feb. 21, 2012 which are hereby incorporated by reference herein in their entirety.

What is claimed is:

1. An image processing apparatus comprising:
a segmentation unit configured to segment, as to image data which has been input, the input image data being image data of a plurality of frames, image data piece included in each of the plurality of frames into a plurality of segments to create a plurality of segmented image data pieces for each of the plurality of frames;
a detection unit configured to execute, as to the plurality of segmented image data pieces which has been input, face detection processing for detecting a face area from each of the plurality of input segmented image data pieces;
a recognition unit configured to execute recognition processing for determining whether the face detected by the detection unit is a face of a registered person, in each of the plurality of segmented image data pieces which has been input; and
a control unit connected to the detection unit and the recognition unit, and configured to control whether to cause the recognition unit to execute the recognition processing as to each of the plurality of segmented image data pieces,
wherein, in a case where a first area of a first frame included in the plurality of frames satisfies predetermined conditions and a second area of the first frame does not satisfy the predetermined conditions, the control unit causes the recognition unit to execute the recognition processing for segmented image data piece which, among a plurality of segmented image data pieces created from a second frame included in the plurality of frames, corresponds to the first area of the first frame, and causes the detection unit to execute the face detection processing without causing the recognition unit to execute the recognition processing for segmented image data piece which, among the plurality of segmented image data pieces created from the second frame, corresponds to the second area of the first frame, and
wherein the predetermined conditions include a condition that the face area has been detected by the detection unit.

2. The image processing apparatus according to claim 1, wherein the segmentation unit reduces, for each of the plurality of frames, the image data piece included in the frame, and wherein the detection unit executes the face detection processing on reduced image data piece, which has been input, of the first frame.

3. The image processing apparatus according to claim 2, wherein the predetermined conditions further includes a condition that a size of a face detected from the reduced image data piece of the first frame is equal to or larger than a threshold.

4. The image processing apparatus according to claim 1, wherein, in a case where the first area of the first frame satisfies the predetermined conditions, the control unit causes the recognition unit to execute the recognition processing and causes the detection unit to execute the face detection processing as to the segmented image data piece which, among the plurality of segmented image data pieces created from the second frame by the segmentation unit, corresponds to the first area of the first image.

5. The image processing apparatus according to claim 1, wherein the predetermined conditions further includes a condition that a ratio of an area of the face area detected by the detection unit as to an area of the plurality of segmented image data pieces is equal to or higher than a threshold.

6. An image processing method comprising:
segmenting, as to image data which has been input, the input image data being image data of a plurality of frames, image data piece included in each of the plurality of frames into a plurality of segments to create a plurality of segmented image data pieces for each of the plurality of frames;
executing face detection processing for detecting a face area from each of the plurality of input segmented image data pieces;
executing, recognition processing for determining whether the detected face is a face of a registered person, in each of the plurality of segmented image data pieces; and
controlling whether the recognition processing is executed as to each of the plurality of segmented image data pieces,
wherein, in a case where a first area of a first frame included in the plurality of frames satisfies predetermined conditions and a second area of the first frame does not satisfy the predetermined condition, the recognition processing is caused to be executed for segmented image data piece which, among a plurality of segmented image data pieces created from a second frame included in the plurality of frames, corresponds to the first area of the first frame, the face detection processing is caused to be executed without causing the recognition processing to execute the recognition processing for segmented image data piece which, among the plurality of segmented image data pieces created from the second frame, corresponds to the second area of the first frame,
wherein the predetermined conditions include a condition that the face area has been detected by the detection processing, and
wherein the method is performed using a computer or processor.

* * * * *